(12) United States Patent
Togawa

(10) Patent No.: US 6,931,557 B2
(45) Date of Patent: *Aug. 16, 2005

(54) INFORMATION PROCESSING APPARATUS, POWER CONTROL METHOD AND RECORDING MEDIUM TO CONTROL A PLURALITY OF DRIVING UNITS ACCORDING TO THE TYPE OF DATA TO BE PROCESSED

(75) Inventor: Yoshifusa Togawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,879

(22) Filed: Apr. 7, 1999

(65) Prior Publication Data

US 2003/0110323 A1 Jun. 12, 2003

(30) Foreign Application Priority Data

Jul. 7, 1998 (JP) .......................................... 10-192009

(51) Int. Cl.[7] ............................................... G06F 1/32
(52) U.S. Cl. ...................................................... 713/323
(58) Field of Search ................................ 713/300–340

(56) References Cited

U.S. PATENT DOCUMENTS

| | | | | |
|---|---|---|---|---|
| 5,167,024 A | * | 11/1992 | Smith et al. | 713/323 |
| 5,452,401 A | * | 9/1995 | Lin | 713/322 |
| 5,537,650 A | * | 7/1996 | West et al. | 713/324 |
| 5,659,763 A | * | 8/1997 | Ohashi | 713/320 |
| 5,666,537 A | * | 9/1997 | Debnath et al. | 712/32 |
| 5,692,204 A | * | 11/1997 | Rawson et al. | 713/310 |
| 5,719,800 A | * | 2/1998 | Mittal et al. | 713/321 |
| 5,737,616 A | * | 4/1998 | Watanabe | 700/286 |

(Continued)

FOREIGN PATENT DOCUMENTS

| | | | | |
|---|---|---|---|---|
| DE | 195 30 095 A1 | 2/1997 | | |
| JP | 57-104992 | 6/1982 | | |
| JP | 359009729 A | * 9/1984 | ............. G06F/1/00 |
| JP | 62-34218 | 2/1987 | | |
| JP | 4-364266 | 12/1992 | | |
| JP | 8-307783 | 11/1996 | | |
| JP | 9-163043 | 6/1997 | | |
| JP | 11167439 A | * 6/1999 | ............. G06F/1/26 |

OTHER PUBLICATIONS

Office Action cited by German Patent Office in German Patent Application No. 123PAT393–DE, mailed: Aug. 29, 2003.

IBM Technical Disclosure Bulletin, vol. 33, No. 11, Apr. 1991, pp. 378 and 379.

*Primary Examiner*—Paul R. Myers
(74) *Attorney, Agent, or Firm*—Staas & Halsey LLP

(57) ABSTRACT

An information processing apparatus which drives a plurality of driving units according to data to be processed includes a first unit which detects a type of the data to be processed and a second unit which controls each of the plurality of driving units according to the type of the data to be processed. Power save control information and names of devices applied to the power save control are read from a predetermined power save mode table according to the detected type of the data and a power save operation is executed for the driving units according to the power save control information.

37 Claims, 10 Drawing Sheets

U.S. PATENT DOCUMENTS

| | | | | |
|---|---|---|---|---|
| 5,752,050 A | * | 5/1998 | Hernandez et al. | 713/330 |
| 5,754,869 A | * | 5/1998 | Holzhammer et al. | 713/300 |
| 5,790,877 A | * | 8/1998 | Nishiyama et al. | 713/320 |
| 5,815,724 A | * | 9/1998 | Mates | 712/242 |
| 5,828,568 A | * | 10/1998 | Sunakawa et al. | 700/79 |
| 5,832,280 A | * | 11/1998 | Swanberg | 710/14 |
| 5,954,820 A | * | 9/1999 | Hetzler | 713/323 |
| 5,996,083 A | * | 11/1999 | Gupta et al. | 713/322 |
| 6,092,209 A | * | 7/2000 | Holzhammer et al. | 713/324 |
| 6,098,175 A | * | 8/2000 | Lee | 713/320 |
| 6,115,823 A | * | 9/2000 | Velasco et al. | 710/16 |
| 6,219,796 B1 | * | 4/2001 | Bartley | 712/214 |
| 6,282,667 B1 | * | 8/2001 | Nakazato | 713/323 |
| 6,307,281 B1 | * | 10/2001 | Houston | 307/31 |

\* cited by examiner

FIG. 6

```
        START
          │
          ▼
┌─────────────────────────┐
│ SELECTION OF A PROCEDURE TO │ ~ S1-1
│ REGISTER A POWER SAVE MODE  │
└─────────────────────────┘
          │
          ▼
┌─────────────────────────────┐
│ REGISTRATION OF INFORMATION ON │
│ DEVICES IN WHICH TO SHUT THE POWER │
│ DOWN OR ENTER INTO THE SUSPEND │ ~ S1-2
│ MODE IN THE TABLE, WHICH       │
│ INFORMATION CORRESPONDS TO THE │
│ TYPE OF DATA, SUCH AS MPEG, MIDI │
│ AND SO ON                      │
└─────────────────────────────┘
          │
          ▼
         END
```

FIG. 7

| MPEG | DEVICE 1-1 | SUSPEND | · · · · | DEVICE 1-n | POWER OFF |
|------|------------|---------|---------|------------|-----------|
| MIDI | DEVICE 2-1 | POWER OFF | · · · · | DEVICE 2-n | SUSPEND |
| · · · · | · · · · · | · · · · · | · · · · | · · · · · | · · · · · |

FIG. 9
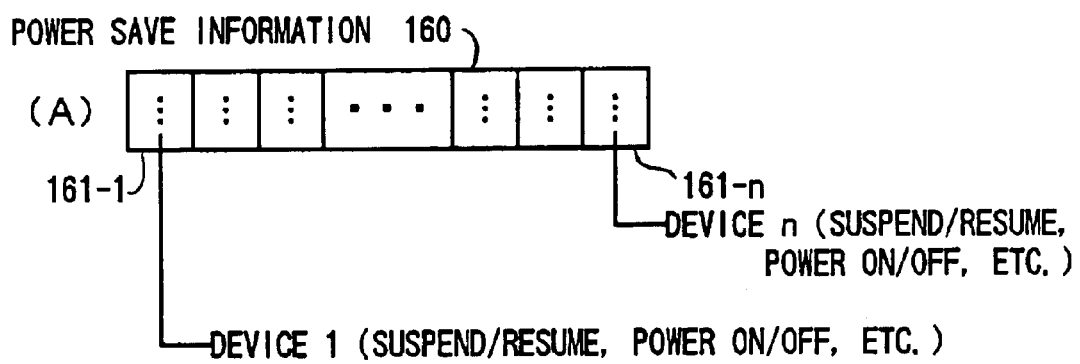
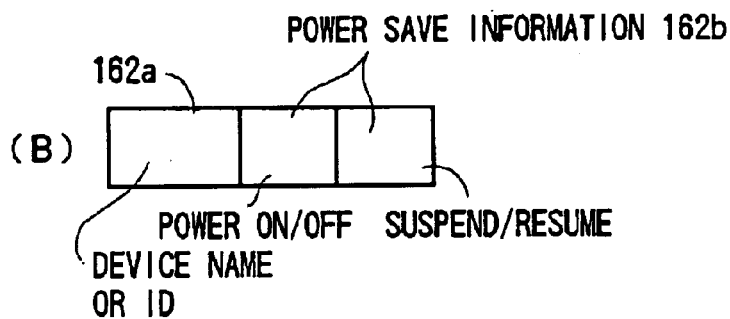

INFORMATION PROCESSING APPARATUS, POWER CONTROL METHOD AND RECORDING MEDIUM TO CONTROL A PLURALITY OF DRIVING UNITS ACCORDING TO THE TYPE OF DATA TO BE PROCESSED

The present application is based on Japanese priority application No. 10-192009 filed on Jul. 7, 1998, the entire contents of which are thereby incorporated by reference.

BACKGROUND OF THE INVENTION

1. Field of the Invention

The present invention generally relates to information processing apparatuses, power control methods and recording media, and more particularly to an information processing apparatus which drives a plurality of processing units according to different types of files, a power control method therefor and a recording medium used therewith.

In recent years, information processing apparatuses have become small sized and portable because they can operate using batteries. Maximum reduction of dissipation power is needed for these apparatuses. On the other hand, multimedia devices have progressed, such that data which is processed in the information processing apparatuses now consist of a plurality of types of data such as moving pictures, sound and still pictures. It is necessary to activate a graphics board to display the moving pictures and still pictures and to activate a sound board to play back the sound data. However, only the sound board needs to be activated when the sound data is played back, but the moving pictures and still pictures are not displayed. In this case, if both the sound board and the graphics board are activated together, the power efficiency degrades because power which is supplied to the graphics board is wasted. Accordingly, it is desired to raise the power efficiency.

2. Description of the Related Art

Conventionally, personal computers use power save functions which become active if an access to the personal computers does not occur or each of processing units spontaneously moves into a suspend mode. Japanese Laid-Open Patent Application No. 57-104992, Japanese Laid-Open Patent Application No. 62-34218, Japanese Laid-Open Patent Application No. 4-364266, Japanese Laid-Open Patent Application No. 8-307783 and Japanese Laid-Open Patent Application No. 9-163043 disclose examples of methods to achieve a high power efficiency for electrical apparatuses.

Japanese Laid-Open Patent Application No. 57-104992 discloses a power save control method. In the method, a first mode or a second mode is detected. When the second mode is detected, power which is supplied in the first mode is shut down. Therefore, the first mode becomes inactive when the second mode is active.

Japanese Laid-Open Patent Application No. 62-34218 discloses an electrical apparatus of which operators can decide whether to execute a power save operation.

Japanese Laid-Open Patent Application No. 4-364266 discloses a power save apparatus for a sound circuit to shut down the sound circuit according to a result of detection of whether a CD is a CD-ROM or a musical CD based on TOC (Table of Contents) information.

Japanese Laid-Open Patent Application No. 8-307783 discloses a television apparatus which is equipped with a CD player. The television apparatus detects whether a CD is in place in the CD player. If the CD is in place in the CD player, the television apparatus detects a type of the CD. Then, the television apparatus controls the CD player according to the presence of the CD in it and drives necessary circuits according to the type of the CD.

Japanese Laid-Open Patent Application No. 9-163043 discloses a copy system, to which sub-controllers for expansion may or may not be connected, which copy system enables an optimum power save control. However, the copy system does not execute the power save control if the sub-controllers for expansion are not connected.

The method disclosed in Japanese Laid-Open Patent Application No. 57-104992 only executes the power save control according to the mode. Therefore, the method does not achieve a precise power save control according to a type of data or for each of the processing units.

In the method disclosed in Japanese Laid-Open Patent Application No. 62-34218, each of the processing units which is not used must be manually shut down. As users don't usually shut down the processing units, power is not saved.

The apparatus disclosed in Japanese Laid-Open Patent Application No. 4-364266 executes a power save control according to the TOC information of each medium when a CD-ROM is inserted and its TOC information is read. Therefore, it does not achieve the precise power save control.

The apparatus disclosed in Japanese Laid-Open Patent Application No. 8-307783 controls circuits according to whether a CD is inserted in it and the type of CD when the CD is inserted. It does not execute the precise power save control according to information recorded on the CD or for each processing unit which is driven.

The copy system disclosed in Japanese Laid-Open Patent Application No. 9-163043 only executes the power save control when the sub-controllers for expansion are connected. Therefore, it does not achieve the precise power save control according to the type of data or for each of the processing units.

SUMMARY OF THE INVENTION

It is a general object of the present invention to provide information processing apparatuses, power control methods and recording medium in which the above disadvantages are eliminated.

A more specific object of the present invention is to provide information processing apparatuses, power control methods and recording medium which achieve the precise power save control.

The above objects of the present invention are achieved by an apparatus which drives a plurality of driving units according to data to be processed. The information processing apparatus includes a detection unit which detects type of the data to be processed and a control unit which controls each of the plurality of driving units according to the type of the data to be processed.

The above objects of the present invention are achieved by an apparatus which drives a plurality of driving units according to data to be processed. The information processing apparatus includes a control unit which controls each of the plurality of driving units according to control data added to the data to be processed.

The above objects of the present invention are achieved by a method which controls power supplied to a plurality of driving units to be supplied with data to be processed. The power control method includes the steps of (a)detecting a type of the data to be processed and (b)controlling each of the plurality of driving units according to said type of the data to be processed.

The above objects of the present invention are achieved by a method which controls power supplied to a plurality of driving units to be supplied with data to be processed. The power control method includes a step for controlling each of the plurality of driving units according to control data added to the data to be processed.

The above objects of the present invention are also achieved by a computer readable recording medium from which a program can be read by a computer that drives a plurality of driving units according to data to be processed. The computer readable recording medium includes the program which has a detection procedure for detecting a type of the data to be processed and a control procedure for controlling each of the plurality of driving units according to the type of the data to be processed.

The above objects of the present invention are also achieved by a computer readable recording medium from which a program can be read by a computer that drives a plurality of driving units according to data to be processed. The computer readable recording medium includes the program which has a control procedure for controlling each of the plurality of driving units according to control data added to the data to be processed.

The above objects of the present invention are also achieved by a computer readable recording medium which includes data that has driving data to be supplied to driving units and control data used to control other driving units.

According to this invention, the types of the data are detected and if the data can not be processed by the driving units, the driving units can be stopped. Consequently, the driving units which are not used are automatically stopped, so that dissipation power can be reduced.

According to this invention, the types of the data are detected and if the data can not be processed by the driving units, the driving units are not supplied with the power. Consequently, the driving units which are not used are automatically stopped, so that the dissipation power can be reduced.

Further, according to this invention, the driving units are controlled by the control data which are added to the data. Consequently, the driving units which are not used are automatically stopped, so that the dissipation power can be reduced.

According to this invention, the driving units are selected according to the control data used to control the driving units. The driving units which are not used are not supplied with the power. Consequently, the driving units which are not used are automatically stopped, so that the dissipation power can be reduced.

BRIEF DESCRIPTION OF THE DRAWINGS

Other objects, features and advantages of the present invention will become more apparent from the following detailed description when read in conjunction with the accompanying drawings, in which:

FIG. 6 is a flowchart for registering a power save mode according to the first embodiment of the present invention;

FIG. 7 is a data structure of a power save mode table according to the first embodiment of the present invention;

FIG. 9 is another example of a data structure of a register for the power save mode table according to the first embodiment of the present invention.

DESCRIPTION OF THE PREFERRED EMBODIMENTS

Figure 1:
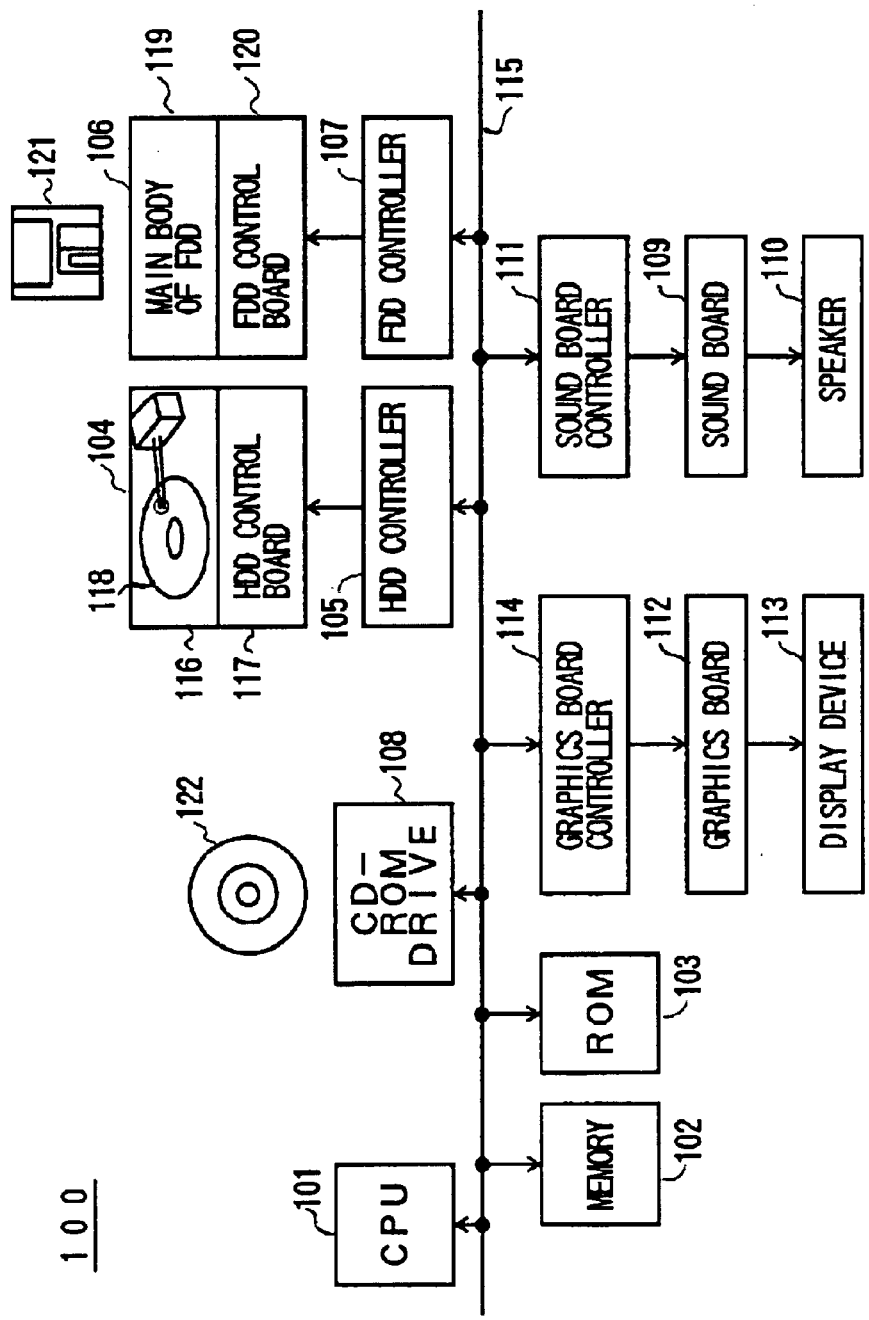
FIG. 1 is a block diagram of a first embodiment of the present invention.

FIG. 1 is a block diagram of a first embodiment of the present invention. An information processing apparatus 100 of this embodiment is mainly made up of a CPU 101, a memory 102, a ROM 103, a hard disc drive 104, a hard disc drive controller 105, a floppy disc drive 106, a floppy disc drive controller 107, a CD-ROM drive 108, a sound board 109, a speaker 110, a sound board controller 111, a graphics board 112, a display device 113, a graphics board controller 114 and a bus 115.

The CPU 101 processes data by desired programs. The memory 102 stores the program and the data. The ROM 103 stores an OS to boot up the information processing apparatus 100.

The hard disc drive 104 mainly include a main body of the hard disc drive 116 and a hard disc drive control board 117. The main body of the hard disc drive 116 has hard discs 118 in it and magnetically stores and retrieves the data on the hard discs. The hard disc drive control board 117 controls the main body of the hard disc drive 116 in response to commands from the bus 115.

The hard disc drive controller 105, which is connected between the hard disc drive 104 and the bus 115, controls the hard disc drive 104 in response to the data processed by the CPU 101.

The floppy disc drive 106 is mainly composed of a main body of the floppy disc drive 119 and a floppy disc drive control board 120. The main body of the floppy disc drive 119, into which a floppy disc 121 is inserted, magnetically stores and retrieves the data on the floppy discs. The floppy disc drive control board 120, which is connected between the main body of the floppy disc drive 119 and the floppy disc drive controller 107, controls the main body of the floppy disc drive 119 in response to the commands from the bus 115.

The floppy disc drive controller 107, which is connected between the floppy disc drive 106 and the bus 115, controls the floppy disc drive 106 in response to the data processed by the CPU 101.

The CD-ROM drive 108, into which a CD-ROM disc 122 is inserted, reads recorded data on the CD-ROM disc in response to the commands from the bus 115 and supplies the data to the bus 115.

The sound board 109 converts sound data into analog sound signals, amplifies them and supplies them to the speaker 110. The speaker 110 converts the analog sound signals into sounds.

The sound board controller 111, which is connected between the sound board 109 and the bus 115, controls the sound board 109 in response to the data processed by the CPU 101.

The graphics board 112 converts the data from the bus 115 into signals which can be displayed on the display device 113, e.g., RGB signals, and supplies them to the display device 113. The display device 113 displays pictures according to the signals from the graphics board 112.

The graphics board controller 114, which is connected between the graphics board 112 and the bus 115, controls the graphics board 112 in response to the data processed by the CPU 101.

The CPU 101, the memory 102, the ROM 103, the hard disc drive 104 through the hard disc drive controller 105, the floppy disc drive 106 through the floppy disc drive controller 107, the sound board 109 through the sound board controller 111 and the graphics board 112 through the graphics board controller 114 are attached to the bus 115. The commands and the data are exchanged among these components through the bus 115.

Figure 2:
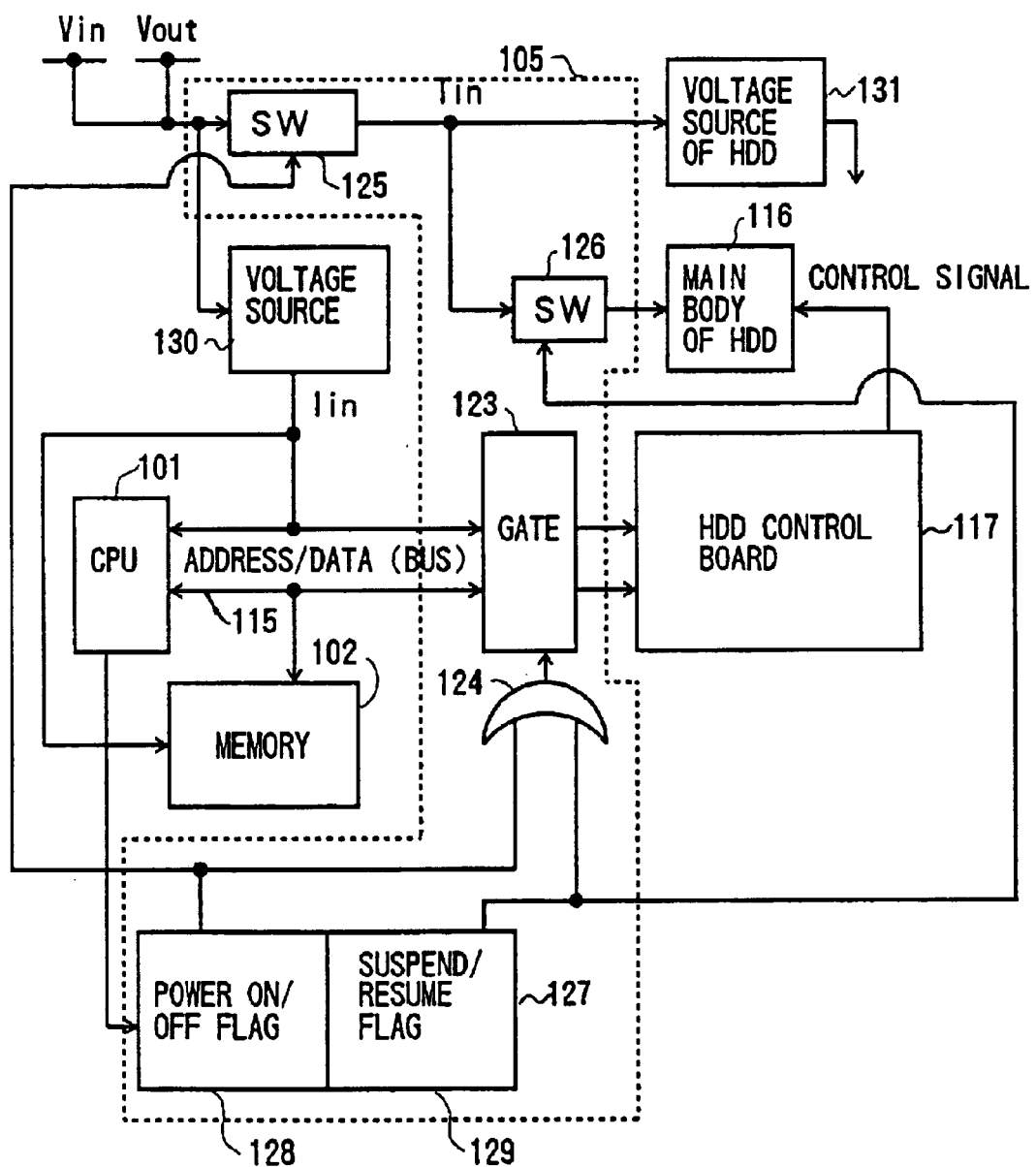
FIG. 2 is a block diagram of a hard disc drive controller according to the first embodiment of the present invention.

FIG. 2 shows a block diagram of the hard disc drive controller 105 according to the first embodiment of the present invention. The hard disc drive controller 105 mainly has a gate 123, an OR gate 124, switches 125, 126, and a register 127.

The gate 123 is connected to the bus 115, a voltage source 130 and the hard disc drive control board 117. The voltage source 130 converts an input power source Vin into a voltage source for the CPU 101, the memory 102, and so on.

The gate 123 controls the status of connection among the bus 115, the voltage source 130 and the hard disc drive control board 117 based on an output signal of the OR gate 124.

The OR gate 124 receives a power on/off flag 128 and a suspend/resume flag 129 from the register 127 and outputs a logical add value. The register 127 is connected to the CPU 101 and holds values in the power on/off flag 128 and the suspend/resume flag 129 in response to commands from the CPU 101.

The switch 125 is connected to the input power source Vin, a voltage source of the hard disc drive 131 and the switch 126. The voltage source of the hard disc drive 131 converts the input power source Vin into a voltage source for the hard disc drive 104. The switch 125 changes its state between on and off according to the power on/off flag 128 in the register 127 and controls supply of the input voltage Vin to both the voltage source of the hard disc drive 131 and the switch 126.

The switch 126 is connected to the switch 125 and the main body of the hard disc drive 116 and controls supply of the voltage Vin to motors in the main body of the hard disc drive 116. The switch 126 changes its state between on and off according to the suspend/resume flag 129 in the register 127 and controls supply of the input voltage Vin to the main body of the hard disc drive 116.

The CPU 101 detects a type of the data of a file with a method described later and writes the values to both the power on/off flag 128 and the suspend/resume flag 129 in the register 127 according to the detected type of the data of the file.

The hard disc drive controller 105 turns the switch 125 on when the power on/off flag 128 in the register 127 is "1" (one). When the switch 125 turns on, power is supplied to both the switch 126 and the voltage source of the hard disc drive 131. Then, if the switch 126 is on, power is supplied to the main body of the hard disc drive 116 and consequently a spindle motor is driven.

Then, if the switch 126 is on, the data can be stored on or retrieved from the hard discs 118. When the power on/off flag 128 in the register 127 is "1" (one), the gate 123 turns on and power is supplied to the hard disc control board 117. As a result, the hard disc control board 117 is connected to the bus 115, so that commands from the bus 115 may be for processed.

If the power on/off flag 128 in the register 127 is "0" (zero), the hard disc drive controller 105 turns the switch 125 off and stops supplying the power to both the switch 126 and the voltage source of the hard disc drive 131.

If the power on/off flag 128 in the register 127 is "0" (zero), the gate 123 turns off, so that the hard disc drive control board 117 is disconnected from both the power and the bus 115.

As explained above, if the power on/off flag 128 in the register 127 is "0" (zero), the hard disc drive 104 completely stops.

The hard disc drive controller 105 turns the switch 126 on when the suspend/resume flag 129 in the register 127 is "1" (one). If the switch 125 is on, the power is supplied to the main body of the hard disc drive 116 and therefore the spindle motor is driven.

When the suspend/resume flag 129 in the register 127 is "1" (one), the gate 123 turns on and the power is supplied to the hard disc control board 117. As a result, the hard disc control board 117 is connected to the bus 115, so that commands from the bus 115 may be processed.

If the suspend/resume flag 129 in the register 127 is "0" (zero), the hard disc drive controller 105 turns the switch 126 off and stops the spindle motor in the main body of the hard disc drive 116.

If the suspend/resume flag 129 in the register 127 is "0" (zero), the gate 123 turns off, so that the hard disc drive control board 117 is disconnected from the power and the bus 115.

As explained above, if the suspend/resume flag 129 in the register 127 is "0" (zero), while the power on/off flag 128 is "1" (one), the power is only supplied to the voltage source of the hard disc drive 131 in the hard disc drive 104. Therefore, only the circuits supplied with the power by the voltage source of the hard disc drive 131 are operational.

Figure 3:
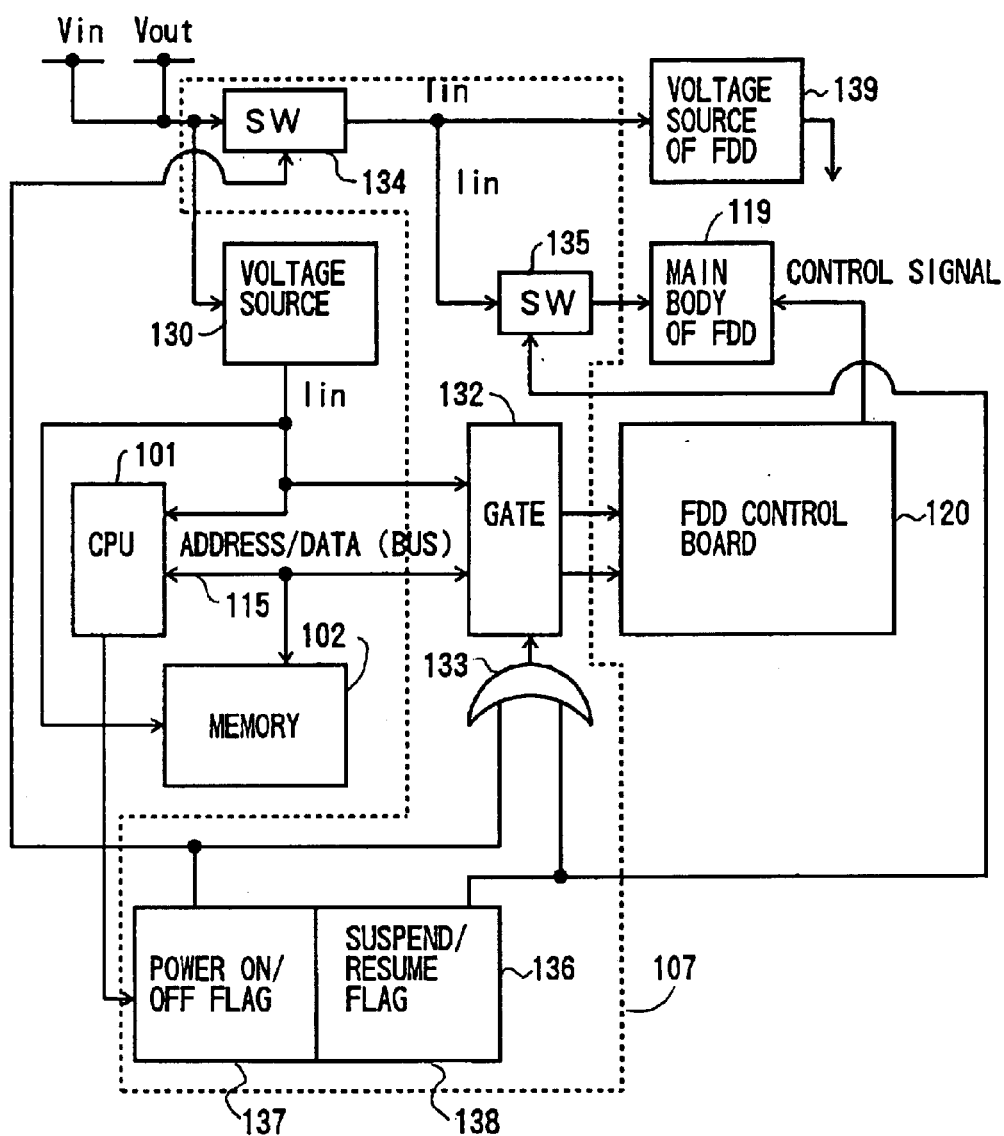
FIG. 3 is a block diagram of a floppy disc drive controller according to the first embodiment of the present invention.

Next, the floppy disc drive controller 107 will be explained. FIG. 3 shows a block diagram of the floppy disc drive controller according to the first embodiment of the present invention. The floppy disc drive controller 107 is mainly made up of a gate 132, an OR gate 133, switches 134, 135, and a register 136.

The gate 132 is connected to the bus 115, the voltage source 130 and the floppy disc drive control board 120. The voltage source 130 converts the input power source Vin into a voltage source for the CPU 101, the memory 102, and so on.

The gate 132 controls the status of connection among the bus 115, the voltage source 130 and the floppy disc drive control board 120 based on an output signal of the OR gate 133.

The OR gate 133 receives a power on/off flag 137 and a suspend/resume flag 138 from the register 136 and outputs the logical add value. The register 136 is connected to the CPU 101 and holds values in the power on/off flag 137 and the suspend/resume flag 138 in response to commands from the CPU 101.

The switch 134 is connected to the input power source Vin, a voltage source of the floppy disc drive 139 and the switch 135. The voltage source of the floppy disc drive 139 converts the input power source Vin into a voltage source for the floppy disc drive 106. The switch 134 changes its state between on and off according to the power on/off flag 137 in the register 136 and controls supply of the input voltage Vin to both the voltage source of the floppy disc drive 139 and the switch 135.

The switch 135 is connected to the switch 134 and the main body of the floppy disc drive 119 and controls supply of the voltage Vin to motors in the main body of the floppy disc drive 119. The switch 135 changes its state between on and off according to the suspend/resume flag 138 in the register 136 and controls supply of the input voltage Vin to the main body of the floppy disc drive 119.

The CPU 101 detects the type of the data of the file with the method described later and writes the values to both the power on/off flag 137 and the suspend/resume flag 138 in the register 136 according to the type of the data of the file.

The floppy disc drive controller 107 turns the switch 134 on when the power on/off flag 137 in the register 136 is "1" (one). When the switch 134 turns on, the power is supplied to both the switch 135 and the voltage source of the floppy disc drive 139. Then, if the switch 135 is on, the power is supplied to the main body of the floppy disc drive 119 and a spindle motor is driven.

Then, if the switch 135 is on, the data can be stored on and retrieved from the floppy discs 121. When the power on/off flag 137 in the register 136 is "1" (one), the gate 132 turns on and the power is supplied to the floppy disc control board 120. As a result, the floppy disc control board 120 is connected to the bus 115, so that commands from the bus 115 may be processed.

If the power on/off flag 137 in the register 136 is "0" (zero), the floppy disc drive controller 107 turns the switch 134 off and stops supplying the power to both the switch 135 and the voltage source of the floppy disc drive 139.

If the power on/off flag 137 in the register 136 is "0" (zero), the gate 132 turns off, so that the floppy disc drive control board 120 is disconnected from both the power and the bus 115.

As explained above, if the power on/off flag 137 in the register 136 is "0" (zero), the floppy disc drive 106 completely stops.

The floppy disc drive controller 107 turns the switch 135 on when the suspend/resume flag 138 in the register 136 is "1" (one). If both the switches 134 and 135 are on, the power is supplied to the main body of the floppy disc drive 119 and therefore the spindle motor is driven.

When the suspend/resume flag 138 in the register 136 is "1" (one), the gate 132 turns on and the power is supplied to the floppy disc control board 120. As a result, the floppy disc control board 120 is connected to the bus 115, so that commands from the bus 115 may be processed.

If the suspend/resume flag 138 in the register 136 is "0" (zero), the floppy disc drive controller 107 turns the switch 135 off and stops the spindle motor in the main body of the floppy disc drive 119.

If the suspend/resume flag 138 in the register 136 is "0" (zero), the gate 132 turns off, so that the floppy disc drive control board 120 is disconnected from the power and the bus 115.

As explained above, if the suspend/resume flag 138 in the register 136 is "0" (zero) while the power on/off flag 137 is "1" (one), the power is only supplied to the voltage source of the floppy disc drive 139 in the floppy disc drive 106. Therefore, only the circuits supplied with the power by the voltage source of the floppy disc drive 139 are operational.

Figure 4:
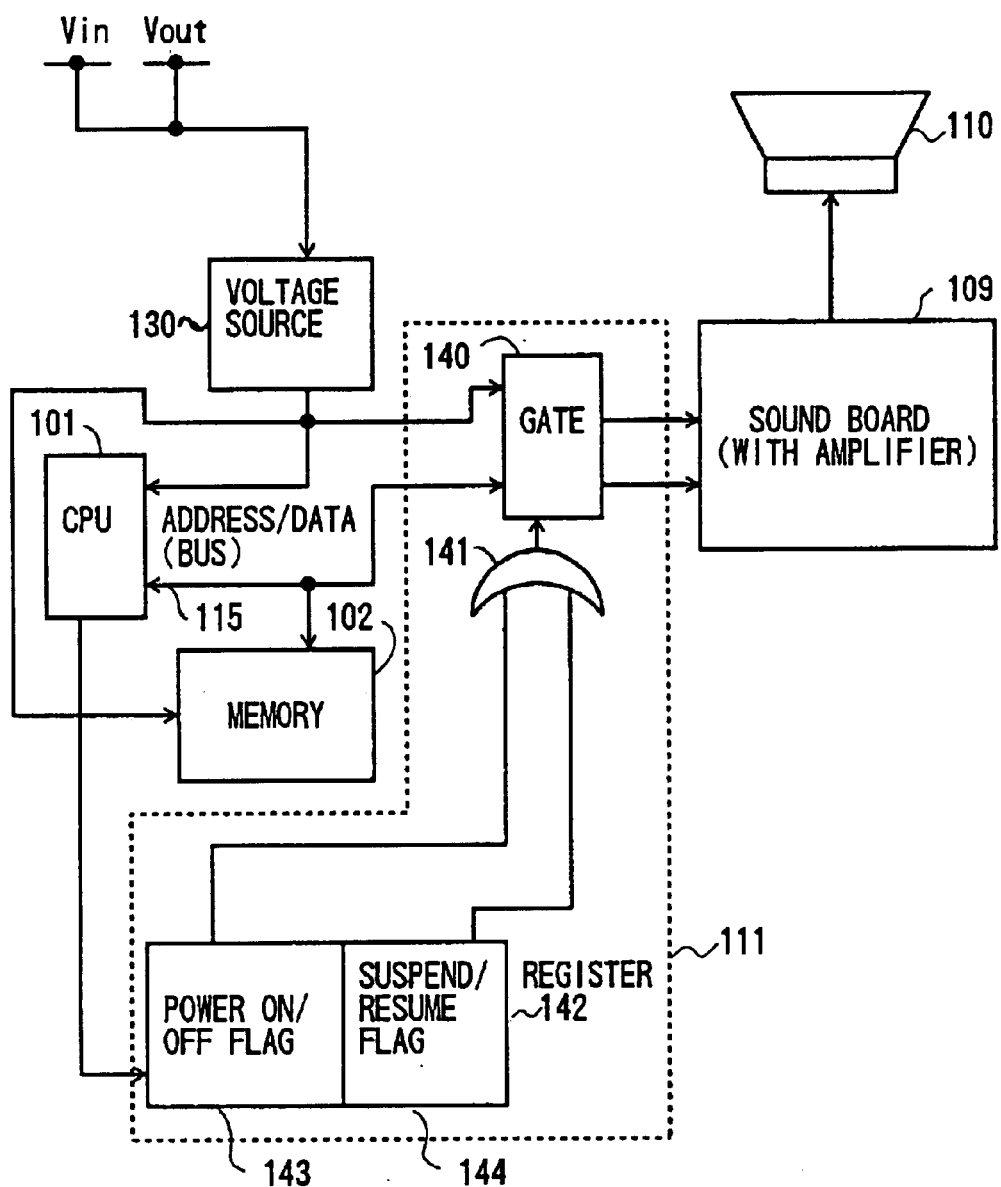
FIG. 4 is a block diagram of a sound board controller according to the first embodiment of the present invention.

Next, the sound board controller 111 will be explained. FIG. 4 shows a block diagram of the sound board controller according to the first embodiment of the present invention. The sound board controller 111 mainly includes a gate 140, an OR gate 141 and a register 142. The gate 140 is connected to the bus 115, the voltage source 130 and the sound board 109. The gate 140 controls the status of connection among the bus 115, the voltage source 130 and the sound board 109 based on an output signal of the OR gate 141.

The OR gate 141 receives a power on/off flag 143 and a suspend/resume flag 144 from the register 142 and outputs the logical add value. The register 142 is connected to the CPU 101 and holds values in the power on/off flag 143 and the suspend/resume flag 144 in response to commands from the CPU 101.

The CPU 101 detects the type of the data of the file with the method described later and writes the values to the power on/off flag 143 and the suspend/resume flag 144 in the register 142 according to the type of the data of the file.

The sound board controller 111 turns the gate 140 on when the power on/off flag 143 in the register 142 is "1" (one). If the gate 140 turns on, the sound board 109 is connected to both the voltage source 130 and the bus 115. The sound board 109 converts sound data into the analog sound signals and supplies them to the speaker 110. The speaker 110 converts analog sound signals into sounds.

If the power on/off flag 143 in the register 142 is "0" (zero), the gate 140 turns off, so that the sound board 109 is disconnected from both the voltage source 130 and the bus 115. Therefore, the sound board 109 completely stops.

If the suspend/resume flag 144 in the register 142 is "1" (one), the sound board controller 111 turns on the gate 140, so that the sound board 109 is connected to both the voltage source 130 and the bus 115. Therefore, the sound board 109 is operational and drives the speaker 110 according to the data from the bus 115. The speaker 110 converts the analog sound signals into sounds.

If the suspend/resume flag 144 in the register 142 is "0" (zero), the gate 140 turns off, so that the sound board 109 is disconnected from both the voltage source 130 and the bus 115. Therefore, the sound board 109 completely stops.

Figure 5:
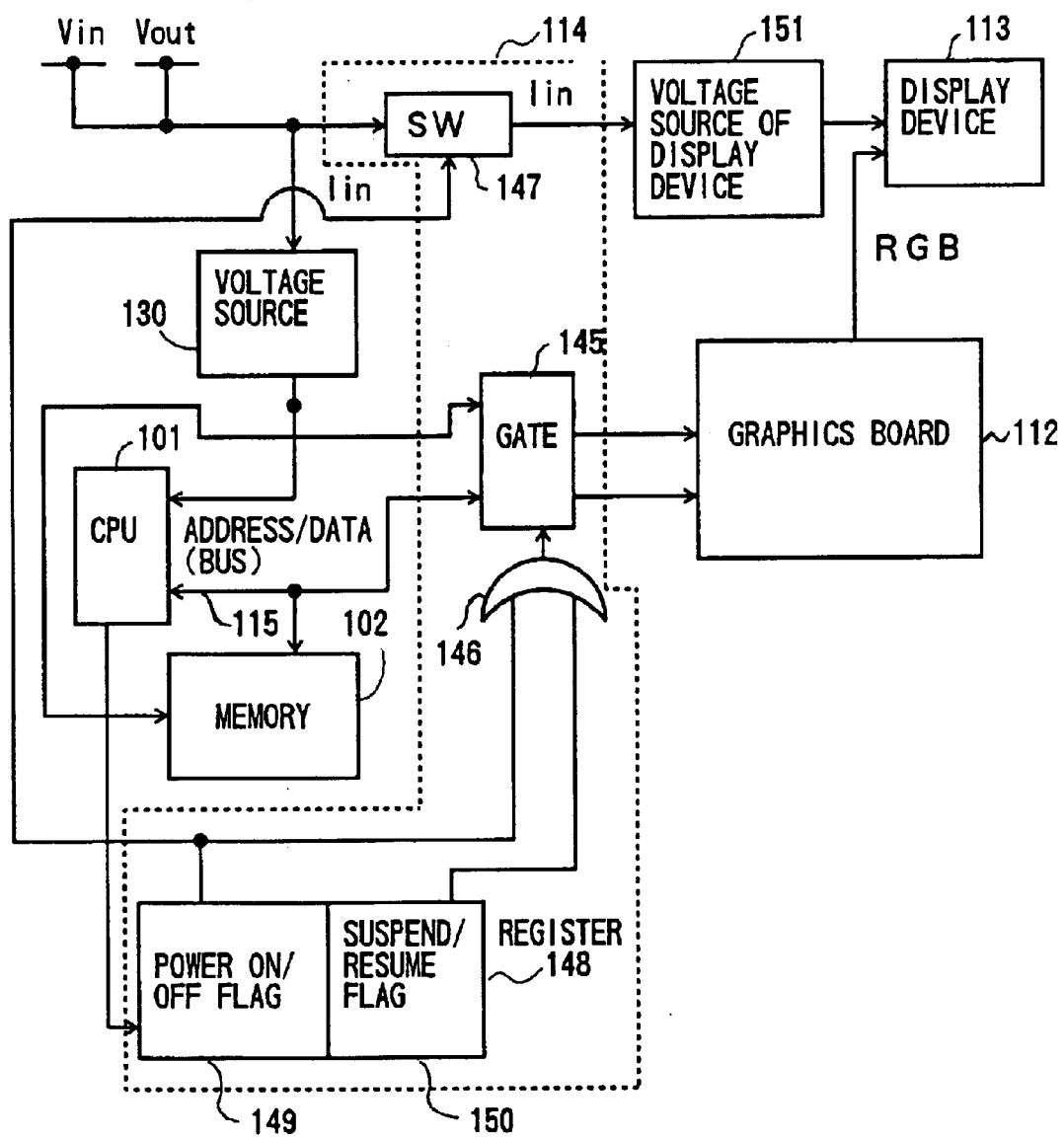
FIG. 5 is a block diagram of a graphics board controller according to the first embodiment of the present invention.

Next, the graphics board controller 114 will be explained. FIG. 5 shows a block diagram of the graphics board controller according to the first embodiment of the present invention.

The graphics board controller 114 includes a gate 145, an OR gate 146, a switch 147 and a register 148. The gate 145 is connected to the bus 115, the voltage source 130 and the graphics board 112. The gate 145 controls the status of connection among the bus 115, the voltage source 130 and the graphics board 112 based on an output signal of the OR gate 146.

The OR gate 146 receives a power on/off flag 149 and a suspend/resume flag 150 from the register 148 and outputs the logical add value of the power on/off flag 149 and the suspend/resume flag 150 from the register 148.

The switch 147 is connected to the input power source Vin and a voltage source of the display device 151. The switch 147 controls supply of the input voltage Vin to the voltage source of the display device 151 according to the power on/off flag 149 in the register 148.

The voltage source of the display device 151 converts the input power source Vin, which is supplied through the switch 147, into a voltage for the display device 113 and supplies the voltage to the display device 113.

The register 148 is connected to the CPU 101. Values are written in the power on/off flag 149 and the suspend/resume flag 150 in the register 148 in response to commands from the CPU 101.

The CPU 101 detects the type of the data of the file with the method described later and writes the values to the power on/off flag 149 and the suspend/resume flag 150 in the register 148 according to the type of the data of the file.

The graphics board controller 114 turns the switch 147 on when the power on/off flag 149 in the register 148 is "1" (one). If the switch 147 turns on, the input power source Vin is supplied to the voltage source of the display device 151. Then, the voltage source of the display device 151 supplies power to the display device 113, so that the display device 113 can display pictures.

When the power on/off flag 149 in the register 148 is "1" (one), the gate 145 turns on, so that the graphics board 112 is connected to both the voltage source 130 and the bus 115. The graphics board 112 drives the display device 113 to display the pictures on the display device 113 according to the display data from the bus 115.

The switch 147 turns off if the power on/off flag 149 in the register 148 is "0" (zero). If the switch 147 turns off, the input power source Vin does not supply the power to the voltage source of the display device 151, so that the power for the display device 113 is not generated and the display device 113 turns off.

If the power on/off flag 149 in the register 148 is "0" (zero), the gate 145 turns off, so that the graphics board 112 is disconnected from both the voltage source 130 and the bus 115. As a result, the graphics board 112 stops.

The graphics controller 114 turns the gate 145 on when the suspend/resume flag 150 in the register 148 is "1" (one). If the gate 145 turns on, the graphics board 112 is connected to both the voltage source 130 and the bus 115. Therefore, the graphics board becomes operational. The graphics board 112 drives the display device 113 to display the pictures on the display device 113 according to the display data from the bus 115.

If the suspend/resume flag 150 in the register 148 is "0" (zero), the gate 145 turns off, so that the graphics board 112 is disconnected from the voltage source 130 and the bus 115. Therefore, the graphics board 112 stops.

Next, the operation of the CPU 101 will be explained. FIG. 6 shows a flowchart to register a power save mode according to the first embodiment of the present invention. At the first step S1-1, a procedure to register the power save mode is selected in the CPU 101. Then, at the second step S1-2, types of data are defined. Next, for each predefined type of data, information on devices in which to shut the power down or to enter into the suspend mode when the predefined type of data is detected is registered. The information which is to be registered include names of the devices, the type of power save mode, such as power on/off or suspend/resume, and so on.

Next, the registered information in the step S1-2 is written in a power save mode table. The power save mode table is assigned in the memory 102.

FIG. 7 shows the data structure of the power save mode table according to the first embodiment of the present invention. The names of the devices and their power save information, which shows what kind of power save control is to be performed, such as power on/off or suspend/resume, in each type of data such as MPEG, MIDI and so on, are registered in the power save mode table.

The CPU 101 detects the type of data and determines the kind of power save control to be done by referring to the power save mode table. Then, the CPU 101 executes the power save control by controlling each of the board controllers according to the determined power save control mode described above.

Figure 8:
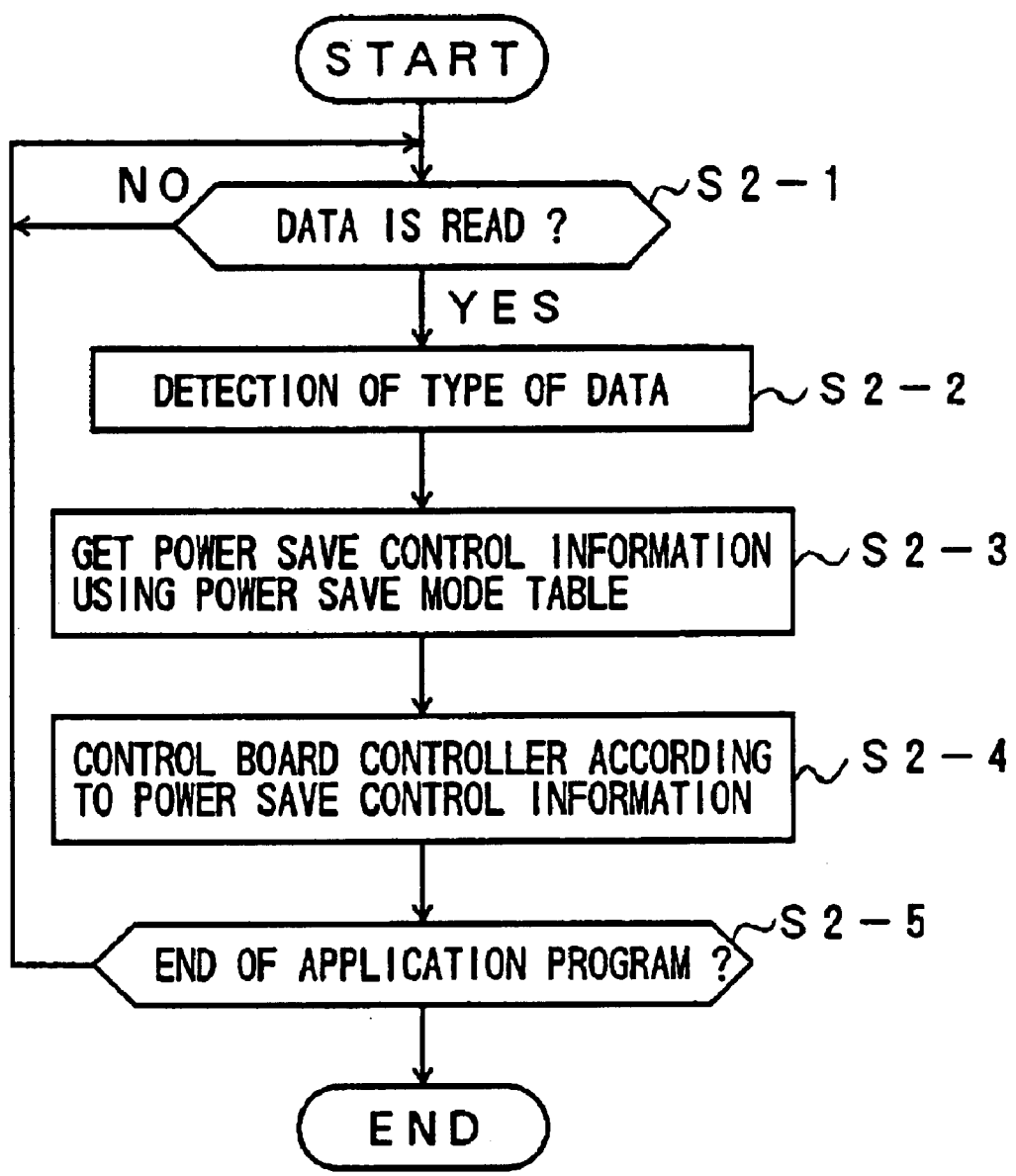
FIG. 8 is a flowchart of a power save control in a CPU according to the first embodiment of the present invention.

FIG. 8 shows a flowchart of the power save control in the CPU 101 according to the first embodiment of the present invention.

The CPU 101 reads data from the CD-ROM 122 which is inserted in the CD-ROM drive 108 according to the desired application program. At the same time, the CPU 101 executes the power save control in parallel with the execution of the application program.

The CPU 101 starts the execution of the power save control when the data is read from the CD-ROM 122 according to the application program (S2-1). Next, the CPU 101 detects the type of the data (S2-2). Then, the CPU 101 reads the power save information from the predetermined power save mode table according to the type of the data detected in step S2-2, the power save information including such as the names of the devices and the power save mode to be applied to the devices, i.e., the power on/off mode or the suspend/resume mode (S2-3).

The power save information which is read in step S2-3 is written to each of the registers 127, 136, 142, 148 in each of the board controllers 105, 107, 111, 114 according to the names of the devices which are also read from the power save mode table. Each of the board controllers 105, 107, 111, 114 executes the power save control, such as the power on/off mode or the suspend/resume mode, based on the power save information stored in each of the registers 127, 136, 142, 148 (S2-4).

Steps from S2-1 to S2-4 described above are repeated until the CPU 101 halts the execution of the application program when the end of the application program is detected.

It is possible that users can freely select the boards for which the power save control will be applied by writing the information in the power save mode table shown in FIG. 7 according to the types of the data with the procedure shown in FIG. 6.

It is possible to collect all the separate registers 127, 136, 142, 148, which are associated with each of the board controllers 105, 107, 111, 114 in the first embodiment, into one register.

FIG. 9 is another example of the data structure of the register for the power save mode table according to the first embodiment of the present invention. FIG. 9(A) shows the construction of the register and FIG. 9(B) shows the data structure of the power save information in each element of the register.

A register 160 has of memory areas from 161-1 to 161-n which store the power save information for each device. Each of the memory areas 161-1 to 161-n stores the device name or identification number information 162*a* and the power save information 162*b* applied to the corresponding device. Each of the board controllers 105, 107, 111, 114 is controlled during its power save operation with the corresponding power save information held in the register 160.

In this embodiment, the power save control is executed according to the power save mode table. However, the power save control may be executed according to predetermined power save information associated with the data which is used in the application program.

Figure 10:
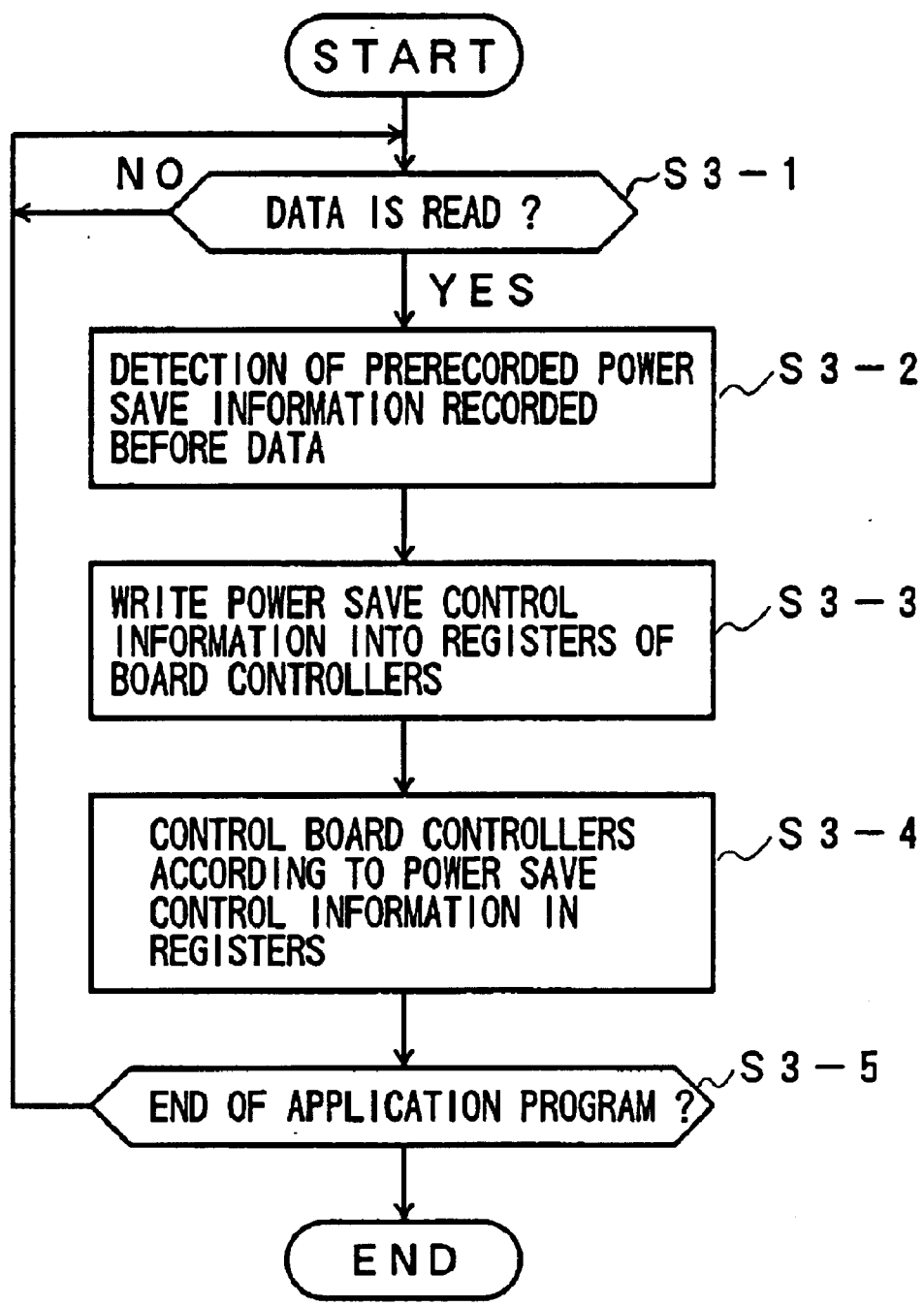
FIG. 10 is a flowchart of a power save control in the CPU according to a second embodiment of the present invention.

FIG. 10 shows a flowchart of the power save control in the CPU according to a second embodiment of the present invention. Explanation of the structure is omitted because it is the same structure as shown in FIG. 1 to FIG. 6.

The CPU 101 reads the data from the CD-ROM 122 which is inserted in the CD-ROM drive 108 according to the application program. At the same time, the CPU 101 executes the power save control in parallel with the execution of the application program.

The CPU 101 starts the execution of the power save control when the data is read from the CD-ROM 122 according to the application program (S3-1). Next, the CPU 101 detects the power save information prerecorded on the CD-ROM 122 just before the data which is used in the application program (S3-2).

The power save information prerecorded just before the data is explained below.

Figure 11:
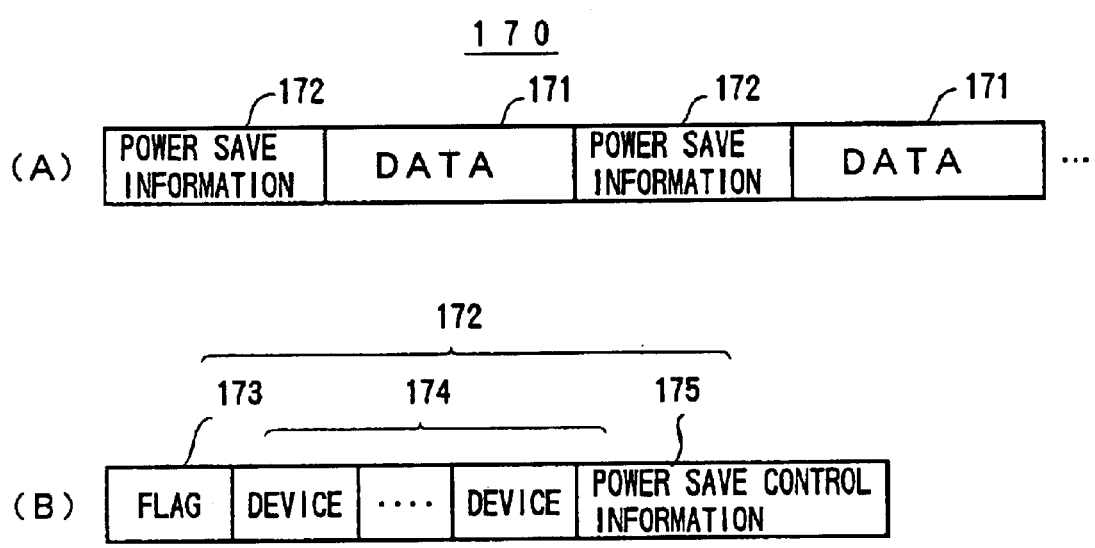
FIG. 11 is a structure of data processed by the CPU according to the second embodiment of the present invention.

FIG. 11 shows the structure of the data processed by the CPU according to the second embodiment of the present invention. FIG. 11(A) shows the structure of the data 170 which is recorded in the CD-ROM 122 and FIG. 11(B) shows the structure of the power save information 172. In this embodiment, the power save information 172 is prerecorded just before the main data 171 in the data 170. The power save information 172 shows the devices which do not use the main data 171.

The power save information 172 includes a flag 173, information to designate the devices 174 and the power save control information 175. If the flag 173 is off, the power save control is executed for the devices which are designated by the information to designate the devices 174 according to the power save control information 175. On the other hand, if the flag 173 is on, the power save control is executed for other devices which are not designated by the information to designate the devices 174 according to the power save control information 175. Thus, the information to designate the devices 174 designates the devices to execute the power save control according to the power save control information 175 when the flag 173 is off. The power save control information 175 shows the kinds of the power save control operations which are to be executed, such as power on/off control or suspend/resume control.

Next, the explanation of the flowchart of FIG. 10 will be continued.

When the power save information 172 is detected in step S3-2, the CPU 101 writes the power save control information 175 in each of the registers 127, 136, 142, 148 in each of the board controllers 105, 107, 111, 114 according to the information to designate the devices 174 (S3-3). Then, each of the board controllers 105, 107, 111, 114 executes the power save operation according to the power save control information 175 written in each of the registers 127, 136, 142, 148 (S3-4).

Step from S3-1 to S3-4 described above are repeated until the CPU 101 halts the execution of the application program when the end of the application program is detected.

This embodiment enables automatic execution of the power save control for each board according to the power save information recorded on the recording media.

The present invention is not limited to the specifically disclosed embodiments, and variations and modifications may be made without departing from the scope of the present invention.

What is claimed is:

1. An information processing apparatus which drives a plurality of driving means according to data obtained by an application program and to be processes by the application program, the information processing apparatus comprising:
   a detection unit which detects type of the data obtained by the application program; and
   a plurality of power control units, each of which to control a corresponding one of the plurality of driving means according to said type of the data obtained by the application program,
   wherein the plurality of driving means is not included in the processor.

2. The information processing apparatus as claimed in claim 1, wherein said control unit controls a power source which supplies power to said plurality of driving means.

3. The information processing apparatus as claimed in claim 2, wherein each of said plurality of power control units supplies power to the corresponding one of said plurality of driving means when the corresponding one of the plurality of driving means can process said type of data obtained by the application program and stops supplying power to the corresponding one of said plurality of driving means when the corresponding one of the plurality of driving means cannot process said type of data obtained by the application program.

4. An information processing apparatus to drive a plurality of driving means according to a type of data obtained by an application program and to be processed by the application program, the information processing apparatus comprising:
   a plurality of power control units, each of which to control a corresponding one of the plurality of driving means according to the type of data obtained by the application program,
   wherein the plurality of driving means is not included in a processor.

5. The information processing apparatus as claimed in claim 4, wherein each of said plurality of power control units controls a power source which supplies power to the corresponding one of said plurality of driving means.

6. A power control method which controls power supplied to a plurality of driving means to be supplied with data obtained by an application program and to be processed by the application program, the power control method comprising:
   detecting a type of the data obtained by the application program; and
   controlling each of said plurality of driving means with a corresponding one of a plurality of power control means according to said type of the data obtained by the application program to be processed,
   wherein the plurality of driving means is not included within a processor.

7. The power control method as claimed in claim 6, wherein each of the plurality of power control means controls a power source which supplies the power to the corresponding one of said plurality of driving means.

8. The power control method as claimed in claim 7, wherein each of the plurality of power control means supplies power to the corresponding one of said plurality of driving means that can process said type of data obtained by the application program, and stops supplying power to the corresponding one of said plurality of driving means that cannot process said type of data obtained by the application program.

9. A power control method which controls power supplied to a plurality of driving means to be supplied with data obtained by an application program and to be processed by the application program, the power control method comprising:

controlling each of said plurality of driving means with a corresponding one of a plurality of power control means according to a type of data obtained by the application program, wherein the plurality of driving means is not included within a processor.

10. The power control method as claimed in claim 9, wherein each of the plurality of power control means controls a power source which supplies the power to the corresponding one of said plurality of driving means.

11. A computer readable recording medium from which a program can be read by a computer which drives a plurality of driving means according to data obtained by an application program and to be processed by the application program, the computer readable recording medium comprising:

the program comprising:

a detection procedure for detecting a type of the data obtained by the application program; and a control procedure for controlling each of said plurality of driving means with a corresponding one of a plurality of power control means according to said type of the data obtained by the application program, wherein the plurality of driving means is not included within a processor.

12. The computer readable recording medium as claimed in claim 11, wherein each of the plurality of power control means controls a power source which supplies power to the corresponding one of said plurality of driving means.

13. The computer readable recording medium as claimed in claim 11, wherein each of the plurality of power control means supplies power to the corresponding one of said plurality of driving means that can process said type of data obtained by the application program and stops supplying the power to the corresponding one of said plurality of driving means which can not process said type of data obtained by the application program.

14. The computer readable recording medium from which a program can be read by a computer which drives a plurality of driving means according to a type of data obtained by an application program and to be processed by the application program, the computer readable recording medium comprising:

the program comprising:

a control procedure for controlling each of said plurality of driving means with a corresponding one of a plurality of power control means according to the type of data obtained by the application program, wherein the plurality of driving means is not included within a processor.

15. The computer readable recording medium as claimed in claim 14 wherein each of the plurality of power control means controls a power source which supplies power to the corresponding one of said plurality of driving means.

16. The computer readable recording medium as claimed in claim 14, wherein each of the plurality of power control means supplies power to the corresponding one of said plurality of driving means that can process said type of data obtained by the application program and stops supplying the power to the corresponding one of said plurality of driving means which cannot process said type of data obtained by the application program.

17. An information processing apparatus to drive a plurality of driving units according to data obtained by an application program and to be processed by the application program, comprising:

a detection unit to detect a type of the data obtained by the application program; and a plurality of power control units, each of which to control a corresponding one of the plurality of driving units according to the type of the data obtained by the application program, wherein the plurality of driving units is not included in a processor.

18. The information processing apparatus of claim 17, wherein each of the plurality of power control units controls a power source which supplies power to the corresponding one of the plurality of driving units.

19. The information processing apparatus of claim 18, wherein each of the plurality of power control units supplies power to the corresponding one of the plurality of driving units when the corresponding one of the plurality of driving units can process the type of data obtained by the application program, and wherein each of the plurality of power control units stops supplying power to the corresponding one of the plurality of driving units when the corresponding one of the plurality of driving units cannot process the type of data obtained by the application program.

20. An information processing apparatus to drive a plurality of driving units according to a type of data obtained by an application program and to be processed by the application, comprising;

a plurality of power control units, each of which to control a corresponding one of the plurality of driving units according to the type of data obtained by the application program, wherein the plurality of driving units is not included in a processor.

21. The information processing apparatus of claim 20, wherein each of said plurality of power control units controls a power source which supplies power to the corresponding one of said plurality of driving units.

22. A power control method to control power supplied to a plurality of driving units to be supplied with data obtained by an application program and to be processed by the application program, comprising:

detecting a type of the data obtained by the application program to be processed; and controlling each of the plurality of driving units with a corresponding one of a plurality of power control units according to the type of the data obtained by the application program, wherein the plurality of driving units is not included within a processor.

23. The power control method of claim 22, wherein each of the plurality of power control units controls a power source that supplies the power to the corresponding one of the plurality of driving units.

24. The power control method of claim 23 wherein each of the plurality of power control units supplies power to the corresponding one of the plurality of driving units that can process the type of data obtained by the application program, and stops a supply of power to the corresponding one of the plurality of driving units that cannot process the type of data obtained by the application program.

25. A power control method to control power supplied to a plurality of driving units to be supplied with data obtained by an application program and to be processed by the application program, comprising:

controlling each of the plurality of driving units with a corresponding one of a plurality of power control units according a type of data obtained by the application program, wherein the plurality of driving units is not included within a processor.

26. The power control method of claim 25, wherein each of the plurality of power control units controls a power source that supplies the power to the corresponding one of the plurality of driving units.

27. A computer readable recording medium from which a program can be read by a computer to drive a plurality of driving units according to data obtained by an application program and to be processed by the application program, comprising:

detecting a type of the data obtained by the application program; and controlling each of the plurality of driving units with a corresponding one of a plurality of power control units according to the type of the data obtained by the application program, wherein the plurality of driving units is not included within a processor.

28. The computer readable recording medium of claim 27, wherein each of the plurality of power control units controls a power source that supplies power to the corresponding one of the plurality of driving units.

29. The computer readable recording medium of claim 27, wherein each of the plurality of power control units supplies power to the corresponding one of the plurality of driving units that can process said type of data obtained by the application program, and stops a supply of power to the corresponding one of the plurality of driving units that cannot process said type of data obtained by the application program.

30. A computer readable recording medium from which a program can be read by a computer to drive a plurality of driving units according to a type of data obtained by an application program and to be processed by the application, comprising:

controlling each of the plurality of driving units with a corresponding one of a plurality of power control units according to the type of data obtained by the application program, wherein the plurality of driving units is not included within a processor.

31. The computer readable recording medium of claim 30, wherein each of the plurality of power control units controls a power source that supplies power to the corresponding one of the plurality of driving units.

32. The computer readable recording medium of claim 30, wherein each of the plurality of power control units supplies power to the corresponding one of the plurality of driving units that can process said type of data obtained by the application program, and stops a supply of power to the corresponding one of the plurality of driving units that cannot process the type of data obtained by the application program.

33. An information processing apparatus to drive a plurality of units according to data to be processed, comprising:

a detection unit to detect a type of the data to be processed;

a plurality of power control units, each of which to control a corresponding one of the plurality of driving units according to the type of the data to be processed; and a storage unit which stores the data to be processed and application software distinct from the data to be processed, wherein the plurality of driving units is not included in a processor, and wherein the information processing apparatus reads the application software and the data to be processed substantially simultaneously, and executes the application software while driving the driving units.

34. An information processing apparatus to drive a plurality of driving units according to data to be processed, comprising:

a storage unit which stores a plurality of types of data, the types of data correlated with at least one of the driving units in a power saving mode table stored by the storage unit;

a processor which detects one of the types of data correlated with the one of the driving units; and a plurality of power control units, at least one of which controls the one of the driving units according to the detected one of the types of data read from the power saving mode table.

35. The information processing apparatus according to claim 39, further comprising:

a registration unit which registers information of the one of the driving devices which is shut down when the one of the types of data is detected in the power saving mode table.

36. The information processing apparatus according to claim 39, wherein the power saving mode table includes at least one of a name of the driving unit and an identification number of the driving unit.

37. The information processing apparatus according to claim 39, further comprising:

an application software stored in the storage unit, wherein the processor reads the power saving mode table and the application software from the storage device substantially simultaneously, and wherein the processor executes the application software while the power control units control the driving units.

* * * * *

UNITED STATES PATENT AND TRADEMARK OFFICE
CERTIFICATE OF CORRECTION

PATENT NO. : 6,931,557 B2
APPLICATION NO. : 09/285879
DATED : August 16, 2005
INVENTOR(S) : Yoshifusa Togawa It is certified that error appears in the above-identified patent and that said Letters Patent is hereby corrected as shown below:

Cover Page, Line (54) Title of the Invention, please change "INFORMATION PROCESSING APPARATUS, POWER CONTROL METHOD AND RECORDING MEDIUM TO CONTROL A PLURALITY OF DRIVING UNITS ACCORDING TO THE TYPE OF DATA TO BE PROCESSED" to -- INFORMATION PROCESSING APPARATUS, POWER CONTROL METHOD, AND RECORDING MEDIUM TO CONTROL A PLURALITY OF DRIVING UNITS ACCORDING TO THE TYPE OF DATA TO BE PROCESSED --.

Column 12, line 4, change "which drives" to -- to drive --.

Column 12, line 6, change "processes" to -- processed --.

Column 12, line 8, change "which detects" to -- to detect a --.

Column 12, line 15, change "the" to -- a --.

Column 12, line 17, change "wherein said control unit" to -- wherein each of said control units --.

Column 12, line 18, after "to" insert -- the corresponding one of --.

Column 13, line 57, after "claim 14" insert -- ,--.

Column 14, line 30, change ";" to -- : --.

Column 14, line 57, after "claim 23" insert -- , --.

UNITED STATES PATENT AND TRADEMARK OFFICE
CERTIFICATE OF CORRECTION

PATENT NO. : 6,931,557 B2
APPLICATION NO. : 09/285879
DATED : August 16, 2005
INVENTOR(S) : Yoshifusa Togawa It is certified that error appears in the above-identified patent and that said Letters Patent is hereby corrected as shown below:

Column 16, line 37, change "claim 39" to -- claim 34 --.

Column 16, line 43, change "claim 39" to -- claim 34 --.

Column 16, line 47, change "claim 39" to -- claim 34 --.

Signed and Sealed this

Eighteenth Day of July, 2006

JON W. DUDAS
*Director of the United States Patent and Trademark Office*